United States Patent
Jung et al.

(10) Patent No.: US 8,970,787 B2
(45) Date of Patent: Mar. 3, 2015

(54) IMAGE QUALITY IMPROVEMENT DEVICE AND METHOD THEREOF

(75) Inventors: Jae-han Jung, Seoul (KR); Dong-soo Koo, Suwon-si (KR); Sung-hee Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1304 days.

(21) Appl. No.: 11/849,466

(22) Filed: Sep. 4, 2007

(65) Prior Publication Data

US 2008/0074552 A1 Mar. 27, 2008

(30) Foreign Application Priority Data

Sep. 26, 2006 (KR) .................. 10-2006-0093349

(51) Int. Cl.
*H04N 5/00* (2011.01)
*H04N 9/77* (2006.01)
*H04N 9/64* (2006.01)
*H04N 9/78* (2006.01)

(52) U.S. Cl.
CPC . *H04N 9/646* (2013.01); *H04N 9/78* (2013.01)

USPC .......................................... 348/607; 348/663

(58) Field of Classification Search
CPC ................................. H04N 5/21; H04N 9/78
USPC .......................................... 348/663, 664, 607
See application file for complete search history.

(56) References Cited

U.S. PATENT DOCUMENTS

| 6,774,954 B1* | 8/2004 | Lee .................................. 348/665 |
| 2002/0060737 A1* | 5/2002 | Hsieh et al. ..................... 348/208 |
| 2005/0088574 A1* | 4/2005 | Suzuki et al. .................. 348/663 |
| 2005/0168644 A1* | 8/2005 | Demas et al. .................. 348/630 |

FOREIGN PATENT DOCUMENTS

KR 100327385 B1 2/2002

* cited by examiner

*Primary Examiner* — Nasser Goodarzi
*Assistant Examiner* — Michael Hong
(74) *Attorney, Agent, or Firm* — Sughrue Mion, PLLC

(57) ABSTRACT

Disclosed are an image quality improvement device and method. The image quality improvement device includes a filter which separates an input video signal into a luminance signal and a chrominance signal, and a noise reduction unit which detects a motion in the input video signal by using the luminance signal separated by the filter, and thereby performing different filtering operations according to the existence of the motion.

24 Claims, 4 Drawing Sheets

IMAGE QUALITY IMPROVEMENT DEVICE AND METHOD THEREOF

CROSS-REFERENCE TO RELATED APPLICATIONS

This application claims priority from Korean Patent Application No. 10-2006-0093349 filed Sep. 26, 2006, in the Korean Intellectual Property Office, the disclosure of which is incorporated herein by reference.

BACKGROUND OF THE INVENTION

1. Field of the Invention

Apparatuses and methods consistent the present invention relate to image quality improvement, and more particularly, to removing artifacts generated when a luminance signal and a chrominance signal are not clearly separated to thereby improve image quality.

2. Description of the Related Art

A composite video signal includes a luminance (Y) signal and a chrominance (C) signal that are modulated within a restricted bandwidth and inputted to an image processing device. Most image processing devices developed in recent years are equipped with a comb filter by which the composite video signal is separated into luminance and chrominance signals and decoded to be restored to an image.

FIG. 1 is a block diagram of a comb filter employed in a related art image processing device for improvement of image quality.

Referring to FIG. 1, the comb filter 10 includes a BSF (Band Stop Filter) 12 and a BPF (Band Pass Filter) 14.

BSF 12 is a filter for eliminating or stopping the interference of a specified band of frequencies. For instance, C signals are filtered out by the BSF 12 and only Y signals are outputted. On the other hand, BPF 14 is a filter that allows only a specified band of frequencies to pass. For instance, only C signals are outputted through the BPF 14.

As the Y signals and C signals are separately outputted from each other by the comb filter 10 with the above configuration, interference between Y and C signals is removed to thereby improve image quality.

In separation of Y and C signals, however, some of the interference is not completely removed depending on the performance of the comb filter 10, and the separation of Y and C signals can be difficult if a high degree of motion is detected in an image. In such case, artifacts such as "dot crawl" or "cross color" appear along the edge of a vertical line, thereby degrading image quality.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an image quality improvement device and method thereof by performing filtering with an adequate filter on an artifact region where an artifact like a dot crawl pattern or cross color is detected.

According to an aspect of the present invention, there is provided an image improvement device, comprising: a filter which separates an input video signal into a luminance signal and a chrominance signal; and a noise reduction unit which detects a motion in the input video signal by using the luminance signal separated by the filter, and thereby performs different filtering operations according to the existence of the motion.

In an exemplary embodiment, the noise reduction unit decides the existence of an edge in the input video signal by using the chrominance signal separated by the filter, and performs a filtering operation according to the existence of the motion if the edge exists in the input video signal.

In an exemplary embodiment, wherein the noise reduction unit performs a two-dimensional filtering operation on the input video signal if a decision has been made that the input video signal has a motion.

In an exemplary embodiment, the two-dimensional filtering operation is performed through a low pass filter.

In an exemplary embodiment, the noise reduction unit performs a three-dimensional filtering operation on the input video signal if a decision has been made that the input video signal does not have a motion.

In an exemplary embodiment, the three-dimensional filtering operation is performed through a filter (G) expressed in the following equation: $G(t)=\{f(t)+f(t-1)\}/2$, in which $f(t)$ indicates a pixel value of the current field, and $f(t-1)$ indicates a pixel value of the previous field.

In an exemplary embodiment, the noise reduction unit decides the existence of an edge in the input video signal by using the chrominance signal separated by the filter, and does not perform the filtering operation if a decision has been made that the edge does not exist in the input video signal.

In an exemplary embodiment, the noise reduction unit comprises: a first detection unit which detects a motion in the input video signal by using the luminance signal separated by the filter; a decision unit which decides the existence of a motion in the input video signal, according to a result detected by the first detection unit; a first filter unit which performs a two-dimensional filtering operation on a region where a motion is detected if the decision unit has decided that the motion exists in the input video signal; and a second filter unit which performs a three-dimensional filtering operation on a region where a motion is detected if the decision unit has decided that the motion does not exist the input video signal.

In an exemplary embodiment, the noise reduction unit further comprises: a second detection unit which detects an edge in the input video signal by using the chrominance signal separated by the filter.

In an exemplary embodiment, the decision unit does not perform both the secondary and three-dimensional filtering operations but outputs the input video signal if the second detection unit has not detected an edge in the input video signal.

In an exemplary embodiment, the noise reduction unit decides that a motion exists in the input video signal if an average of all gray level values of edges existing in fields is not the same for every field composing the same frame.

According to another aspect of the present invention, there is provided an image quality improvement device, comprising: a first detection unit which detects a motion in an input video signal by using a first component included in the input video signal; a decision unit which decides the existence of a motion in the input video signal, according to a result outputted from the first detection unit; and a filter which filters the input video signal, according to the decision result of the decision unit.

In an exemplary embodiment, the image quality improvement device further comprises: a second detection unit which detects an edge in the input video signal by using a second component included in the input video signal.

In an exemplary embodiment, the first detection unit outputs an average of all gray level values of edges existing in fields to at least one field composing the same frame.

In an exemplary embodiment, the decision unit decides that a motion does not exist in the input video signal if an average of all gray level values of edges existing in more than one field composing the same frame is the same for every field.

In an exemplary embodiment, the decision unit decides that a motion exists in the input video signal if an average of all gray level values of edges existing in more than one field composing the same frame is not the same for every field.

In an exemplary embodiment, the decision unit does not perform both the secondary and three-dimensional filtering operations but outputs the input video signal if the second detection unit has not detected an edge in the input video signal.

In an exemplary embodiment, the filter comprises: a first filter unit which performs a two-dimensional filtering operation on a region in which a motion is detected if the decision unit has decided that the motion exists in the input video signal; and a second filter unit which performs a three-dimensional filtering operation on a region in which a motion is not detected if the decision has decided that a motion does not exist in the input video signal.

In an exemplary embodiment, the first filter unit is a low pass filter.

In an exemplary embodiment, the second filter unit performs a filtering operation through a filter (G) expressed in the following equation: $G(t)=\{f(t)+f(t-1)\}/2$, in which $f(t)$ indicates a pixel value of the current field, and $f(t-1)$ indicates a pixel value of the previous field.

In an exemplary embodiment, the first component is a luminance signal, and the second component is a chrominance signal.

Still another aspect of the present invention provides an image quality improvement method, comprising: separating an input video signal into a luminance signal and a chrominance signal; and detecting a motion in the input video signal by using the luminance signal, and thereby performing different filtering operations according to the existence of the motion.

In an exemplary embodiment, the existence of an edge in the input video signal is decided by using the chrominance signal, and if the edge exists in the input video signal, the filtering operation is performed according to the existence of the motion.

In an exemplary embodiment, for the filtering operation a two-dimensional filtering operation is performed on the input video signal if the input video signal has a motion.

In an exemplary embodiment, the two-dimensional filtering operation is performed through a low pass filter.

In an exemplary embodiment, for the filtering operation a three-dimensional filtering operation is performed on the input video signal if the input video signal does not have a motion.

In an exemplary embodiment, the three-dimensional filtering operation is performed through a filter (G) expressed in the following equation: $G(t)=\{f(t)+f(t-1)\}/2$, in which $f(t)$ indicates a pixel value of the current field, and $f(t-1)$ indicates a pixel value of the previous field.

In an exemplary embodiment, for the filtering operation the existence of an edge in the input video signal is decided by using the chrominance signal and the filtering operation is not performed, if a decision has been made that the edge does not exist in the input video signal.

In an exemplary embodiment, the filtering operation comprises: detecting a motion in the input video signal by using the luminance signal separated by the filter; deciding the existence of a motion in the input video signal, according to the detection result; performing a two-dimensional filtering operation on a region where a motion is detected if a decision has been made that the motion exists in the input video signal; and performing a three-dimensional filtering operation on a region where a motion is detected if a decision has been made that the motion does not exist the input video signal.

In an exemplary embodiment, the filtering operation further comprises: detecting an edge in the input video signal by using the chrominance signal separated by the filter.

In an exemplary embodiment, if an edge has not been detected in the input video signal, neither secondary nor three-dimensional filtering operations are performed and the input video signal is outputted.

In an exemplary embodiment, if an average of all gray level values of edges existing in fields is not the same for every field composing the same frame, a decision is made that a motion exists in the input video signal.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
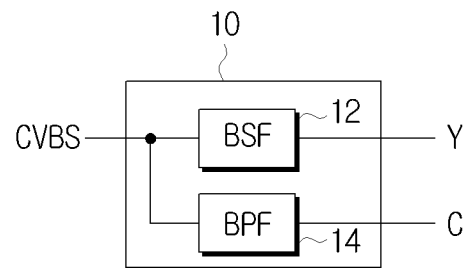
FIG. 1 is a block diagram of a comb filter employed in a related art image processing device for improvement of image quality.

Certain exemplary embodiments of the present invention will be described in greater detail with reference to the accompanying drawings.

In the following description, the same drawing reference numerals are used for the same elements throughout the drawings. The matters defined in the description such as a detailed construction and elements are provided to assist in a comprehensive understanding of the invention. However, the present invention can be carried out in different manners. Also, well-known functions or constructions are not described in detail since they would obscure the invention in unnecessary detail.

Figure 2:
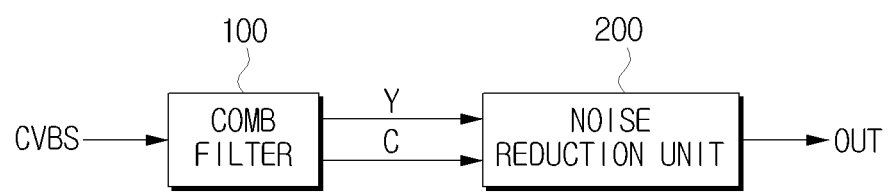
FIG. 2 is a schematic block diagram of an image quality improvement device according to an exemplary embodiment of the present invention.

FIG. 2 is a schematic block diagram of an image quality improvement device according to an exemplary embodiment of the present invention.

Referring to FIG. 2, the image quality improvement device includes a comb filter 100 and a noise reduction unit 200.

The comb filter 100 separates a luminance signal Y and a chrominance signal C from an input video signal of CVBS (Composite Video Blanking Sync) signal, and outputs the Y and C signals.

The noise reduction unit 200 detects the existence of a motion in an input video signal using the Y signal outputted from the comb filter 100, to thereby filter the input video signal. In other words, the noise reduction unit 200 determines whether the motion exists. Also, the noise reduction unit 200 detects the existence of an edge in the input video signal using the C signal outputted from the comb filter 100, and performs filtering on the input video signal or outputs the input video signal if the edge is detected. The configuration and operation of the noise reduction unit 200 will be explained in detail with reference to FIG. 3.

Figure 3:
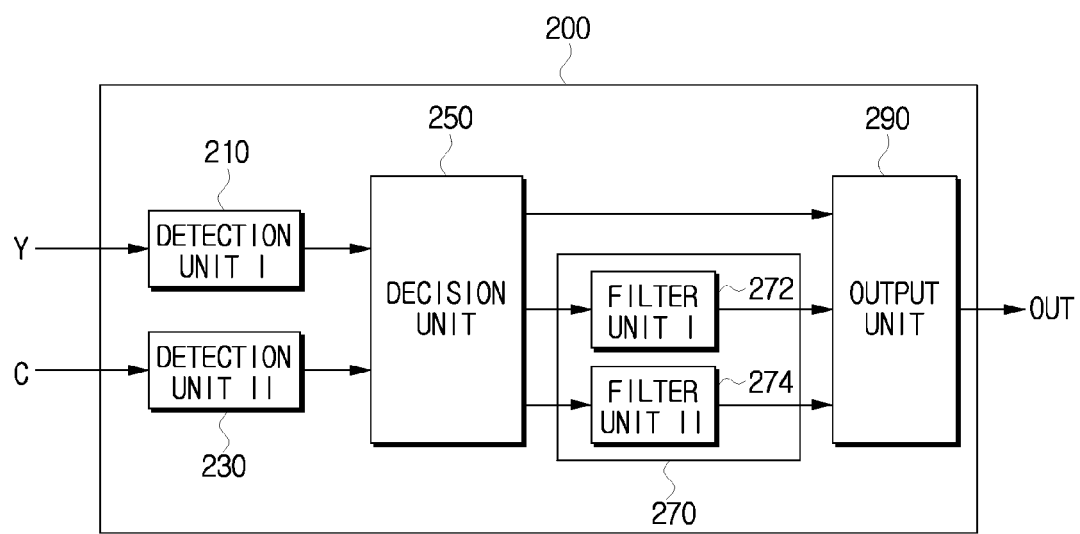
FIG. 3 is a schematic block diagram of a noise reduction unit in the image quality improvement device shown in FIG. 2.

FIG. 3 is a schematic block diagram of the noise reduction unit 200 in the image quality improvement device of FIG. 2.

Referring to FIG. 3, the noise reduction unit 200 includes a first detection unit 210, a second detection unit 230, a decision unit 250, a filter 270, and an output unit 290.

The first detection unit 210 detects a motion in an input video signal using a Y signal outputted from the comb filter 100. In order to detect a motion in an input video signal of one frame, the first detection unit 210 divides a field into a plurality of regions, sums up gray level values of edges existing in all the fields to get an average value thereof, and compares the average value with the gray level value of the same region in a previous field or in a subsequent field.

The second detection unit 230 receives a C signal outputted from the comb filter 100, and detects the existence of an edge in the input video signal. In other words, the second detection unit 230 divides one field into a plurality of regions, and compares magnitudes of pixel values between adjacent pixels. Here, if the magnitude difference in pixel values of adjacent pixels is greater than a predetermined reference value, the second detection unit 230 decides that an edge exists in that region.

Depending on the detection result from the first detection unit 210, if a motion is detected in one of the plural regions, the decision unit 250 transmits a video signal of the corresponding region to a first filter unit 272 (to be described). Meanwhile, if there is a region with no motion, the decision unit 250 transmits a video signal of the corresponding region to a second filter unit 274.

In addition, the decision unit 250, depending on the detection result from the second detection unit 230, transmits a video signal of a region without an edge to the output unit 290 (to be described). And, the decision unit 250 transmits a video signal of a region with an edge to the filter 270.

To be short, the decision unit 250 transmits to the first filter unit 272 a video signal of an overlapping region between the region with a motion and the region with an edge. Further, the decision unit 250 transmits to the second filter unit 274 a video signal of an overlapping region between the region without a motion and the region with an edge. Lastly, the decision unit 250 transmits to the output unit 290 a video signal of the region without an edge, regardless of the existence of a motion in that region.

The filter 270 includes the first and second filter units 272 and 274 for filtering regions with edges.

The first filter unit 272 receives video signals of the regions with motions and edges, and performs a two-dimensional filtering on the received video signals. In other words, the first filter unit 272 functions as an low pass filter (LPF) to remove or filter out high frequency components of a video signal included in a field before outputting the video signal.

The second filter unit 274 receives video signals of the regions in which motions do not exist but edges do, and performs a three-dimensional filtering on the received video signals. In other words, the second filter unit 274 functions as a Guava filter (G) shown in Equation 1 to temporally filter a video signal included in a frame.

$$G(t) = \{f(t) + f(t-1)\}/2 \quad \text{[Equation 1]}$$

In the equation, f(t) indicates a pixel value of the current field, and f(t−1) indicates a pixel value of the previous pixel. Then, an average of the pixel values of the current and previous fields is outputted from the second filter unit 274.

The output unit 290 generates a frame out of a video signal of the filtered region by the filter 270 and a video signal outputted as it is from the decision unit 250. As such, video signals outputted to the output unit 190 have been partially filtered depending on whether a motion and an edge exist in the input video signals.

Figure 4A:
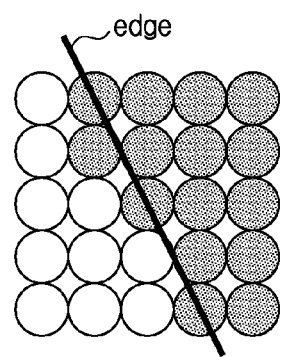
FIGS. 4A and 4B are diagrams for a description of a motion detection method performed by the image quality improvement device shown in FIG. 2.
Figure 4B:
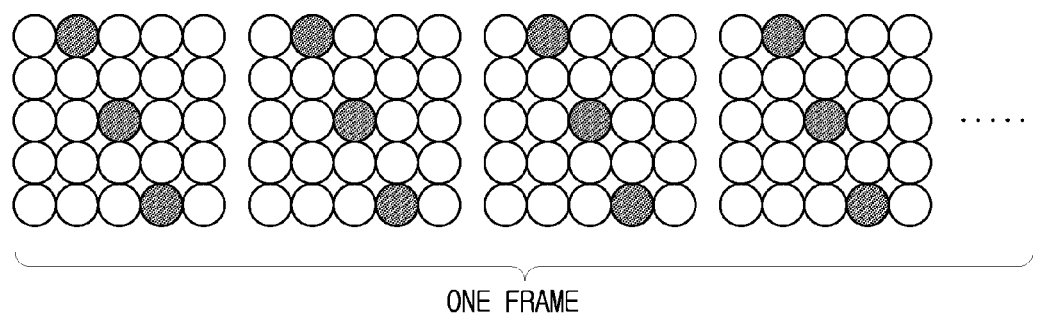

FIGS. 4A and 4B are diagrams for a description of a motion detection method performed by the image quality improvement device shown in FIG. 2.

Referring to FIG. 4A, the first detection unit 210 obtains an average gray level of an edge in a certain region of a field. And, as shown in FIG. 4B, in the same region of all the fields composing one frame, the first detection field 210 compares the average gray level of an edge to thereby detect a motion in the input video signals to one frame.

Figure 5:
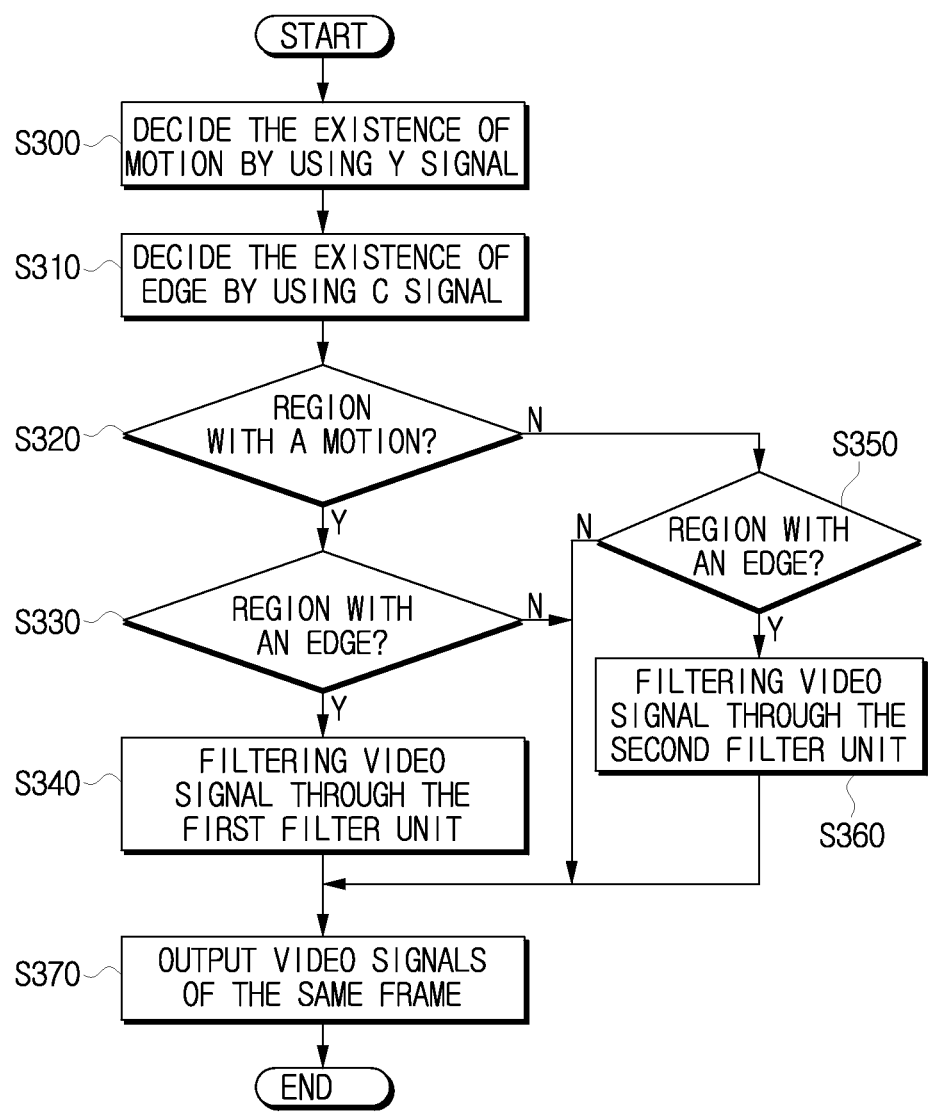
FIG. 5 is a flow chart for sequentially explaining the operation of the image quality improvement device shown in FIG. 2.

FIG. 5 is a flow chart for sequentially explaining the operation of the image quality improvement device shown in FIG. 2.

According to FIG. 5, the first detection unit 210 decides the existence of a motion by using a Y signal (S300). That is, the first detection unit 210 divides one field into a plurality of regions, sums up all the gray level values of edges existing in the respective regions to obtain an average gray level, and compares the average value with that of the previous field or the subsequent field, to thereby detect a motion in an input signal to one frame.

The second detection unit 230 decides the existence of an edge by using a C signal (S310). That is, the second detection unit 230 divides one field into a plurality of regions and compares magnitudes of pixel values between adjacent pixels. Here, if the magnitude difference in pixel values of adjacent pixels is greater than a predetermined reference value, the second detection unit 230 decides that an edge exists in that region.

If it is decided in the first detection unit 210 that a motion exists in a video signal of the outputted region (S320) and if it is decided in the second detection unit 230 that an edge exists in a video signal of the outputted region (S330), the first filter unit 272 filters out the video signals and outputs them (S340). That is, video signals in an overlapping region between the region with a motion and the region with an edge are subjected to the two-dimensional filtering and outputted.

Meanwhile, if it is decided in the first detection unit 210 that a motion does not exist in a video signal of the outputted region (S320), while if it is decided in the second detection unit 230 that an edge exists in a video signal of the outputted region (S350), the second filter unit 274 filters out the video signals and outputs them (S360). That is, video signals in an overlapping region between the region where no motion exists and the region where an edge exists are subjected to the two-dimensional filtering and outputted.

If in operations S330 and S350 that the second detection unit 230 decides that no edge exists in the video signal of the outputted region, the video signal of the input region is not filtered but is outputted as it is.

Lastly, the output unit 290 outputs the video signal of a frame (S370). That is to say, the output unit 290 outputs the video signal having been partially filtered through the first and second filter units 272 and 274.

Through the above-described procedure, artifacts in an input video signal are removed, and therefore the video signal with an improved image quality can be outputted.

Moreover, video signals that are inputted to the noise reduction unit 200 are not necessarily limited to Y signals and C signals, but may include component video signals (Y, Pb, Pr, and Y, U, V) and HD video signals (HSync, VSync, R, G, and B). Among them, RGB signals can be converted by a converter (not shown) into Y and C signals for application.

As explained so far, the image quality improvement device and method according to exemplary embodiments of the present invention can be used for removing artifacts such as dot crawl or cross color, which occur when Y signals and C signals are not clearly separated from composite video signals, by performing a partial filtering on a region where such an artifact is found.

The foregoing exemplary embodiments are merely exemplary and are not to be construed as limiting the present invention. The present disclosure can be readily applied to other types of apparatuses. Also, the description of the exemplary embodiments of the present invention is intended to be illustrative, and not to limit the scope of the claims, as many alternatives, modifications, and variations will be apparent to those skilled in the art.

What is claimed is:

1. An image improvement device comprising:
   a filter which separates an input video signal into a luminance signal and a chrominance signal; and
   a noise reduction unit which detects a motion in the input video signal by using the luminance signal separated by the filter and performs a two-dimensional filtering operation or a three-dimensional filtering operation according to an existence of the motion,
   wherein the noise reduction unit decides that the motion exists in the input video signal if an average of a plurality of gray level values of edges existing in fields is not the same for every field composing the same frame and determines an existence of an edge in the input video signal by using the chrominance signal separated by the filter and performs the two-dimensional filtering operation or the three-dimensional filtering operation according to the existence of the edge in the input video signal.

2. The image quality improvement device of claim 1, wherein the noise reduction unit performs the two-dimensional filtering operation on the input video signal if the input video signal includes the motion.

3. The image quality improvement device of claim 1, wherein the noise reduction unit performs the three-dimensional filtering operation on the input video signal if the input video signal does not include the motion.

4. The image quality improvement device of claim 1, wherein the noise reduction unit determines an existence of an edge in the input video signal by using the chrominance signal separated by the filter, and does not perform the filtering operation if the edge does not exist in the input video signal.

5. The image quality improvement device of claim 1, wherein the noise reduction unit comprises:
   a first detection unit which detects the motion in the input video signal by using the luminance signal separated by the filter;
   a decision unit which determines the existence of the motion in the input video signal, according to a result detected by the first detection unit;
   a first filter unit which performs a two-dimensional filtering operation on a region where the motion is detected if the decision unit has determined that the motion exists in the input video signal; and
   a second filter unit which performs a three-dimensional filtering operation on a region where the motion is detected if the decision unit has determined the motion does not exist in the input video signal.

6. The image quality improvement device of claim 2, wherein the two-dimensional filtering operation is performed through a low pass filter.

7. The image quality improvement device of claim 3, wherein the three-dimensional filtering operation is performed through a filter (G) expressed in the following equation:
   $G(t) = \{f(t) + f(t-1)\}/2$, in which $f(t)$ indicates a pixel value of a current field, and $f(t-1)$ indicates a pixel value of a previous field.

8. The image quality improvement device of claim 5, wherein the noise reduction unit further comprises:
   a second detection unit which detects an edge in the input video signal by using the chrominance signal separated by the filter.

9. The image quality improvement device of claim 8, wherein the decision unit does not perform the secondary and the three-dimensional filtering operations but outputs the input video signal if the second detection unit has not detected the edge in the input video signal.

10. An image quality improvement device comprising:
    a first detection unit which detects a motion in an input video signal by using a luminance signal included in the input video signal;
    a second detection unit which detects an edge in the input video signal by using a chrominance signal included in the input video signal;
    a decision unit which determines an existence of the motion in the input video signal according to the detection operation performed by the first detection unit; and
    a first filter unit and a second filter unit which filters the input video signal, according to the determination operation of the decision unit,
    wherein the first detection unit outputs an average of a plurality of gray level values of edges existing in fields to at least one field composing a same frame, and
    wherein the decision unit determines that the motion exists in the input video signal if the average of a plurality of gray level values of edges existing in more than one field composing the same frame is not equal for every field.

11. The image quality improvement device of claim 10, wherein the decision unit determines that the motion does not exist in the input video signal if the average of the plurality of gray level values of edges existing in more than one field composing the same frame is equal for every field.

12. The image quality improvement device of claim 10, wherein the decision unit does not perform the secondary and the three-dimensional filtering operations but outputs the input video signal if the second detection unit has not detected the edge in the input video signal.

13. The image quality improvement device of claim 10, wherein:
    the first filter unit which performs a two-dimensional filtering operation on a region in which a motion is detected if the decision unit has determined that the motion exists in the input video signal; and
    the second filter unit which performs a three-dimensional filtering operation on a region in which the motion is not detected if the decision unit has determined that the motion does not exist in the input video signal.

14. The image quality improvement device of claim 13, wherein the first filter unit is a low pass filter.

15. The image quality improvement device of claim 13, wherein the second filter unit performs a filtering operation through a filter (G) expressed in the following equation:

$G(t)=\{f(t)+f(t-1)\}/2$, in which f(t) indicates a pixel value of a current field, and f(t−1) indicates a pixel value of a previous field.

16. An image quality improvement method comprising:
separating an input video signal into a luminance signal and a chrominance signal;
detecting a motion in the input video signal by using the luminance signal; and
performing a first filtering operation or a second filtering operation according to detecting of the motion;
wherein if an average of a plurality of gray level values of edges existing in field is not equal for every field composing a same frame, a determination is made that the motion exists in the input video signal, and
wherein for the performing of the first or second filtering operation, an edge in the input video signal is determined using the chrominance signal, and if the edge is in the input video signal, the performing of the first or second filtering operation is performed according to the detecting of the motion.

17. The image quality improvement method of claim 16, wherein for the first filtering operation, a two-dimensional filtering operation is performed on the input video signal if the motion is detected in the input video signal.

18. The image quality improvement method of claim 16, wherein for the second filtering operation a three-dimensional filtering operation is performed on the input video signal if the motion is not detected in the input video signal.

19. The image quality improvement method of claim 16, wherein for the filtering operation, an edge in the input video signal is determined using the chrominance signal and the filtering operation is not performed, if the edge is not detected in the input video signal.

20. The image quality improvement method of claim 16, wherein the filtering operation comprises:
detecting the motion in the input video signal using the luminance signal separated by the filter;
performing a two-dimensional filtering operation on a region where the motion is detected if the motion is detected in the input video signal; and
performing a three-dimensional filtering operation on the region where the motion is detected if the motion is not detected in the input video signal.

21. The image quality improvement method of claim 17, wherein the first filtering operation is performed by a low pass filter.

22. The image quality improvement method of claim 18, wherein the second filtering operation is performed through a filter (G) expressed in the following equation:

$G(t)=\{f(t)+f(t-1)\}/2$, in which f(t) indicates a pixel value of a current field, and f(t−1) indicates a pixel value of a previous field.

23. The image quality improvement method of claim 20, wherein the filtering operation further comprises:
detecting an edge in the input video signal using the chrominance signal separated by the filter.

24. The image quality improvement method of claim 23, wherein if an edge is not detected in the input video signal, the secondary and the three-dimensional filtering operations are not performed and the input video signal is output.

* * * * *